(12) United States Patent
Marks (10) Patent No.: US 7,071,914 B1
(45) Date of Patent: Jul. 4, 2006

(54) USER INPUT DEVICE AND METHOD FOR INTERACTION WITH GRAPHIC IMAGES

(75) Inventor: Richard Marks, Foster City, CA (US)

(73) Assignee: Sony Computer Entertainment Inc. (JP)

( * ) Notice: Subject to any disclaimer, the term of this patent is extended or adjusted under 35 U.S.C. 154(b) by 772 days.

(21) Appl. No.: 09/654,141

(22) Filed: Sep. 1, 2000

(51) Int. Cl.
*G09G 5/00* (2006.01)
*G06F 17/00* (2006.01)

(52) U.S. Cl. .......................... 345/156; 463/36; 715/863

(58) Field of Classification Search ................. 345/156, 345/158, 473, 474, 157; 463/36–39; 700/15, 700/17, 240, 264; 715/863; 382/118, 103, 382/168; 250/221
See application file for complete search history.

(56) References Cited

U.S. PATENT DOCUMENTS

| | | | |
|---|---|---|---|
| 3,943,277 A | 3/1976 | Everly | 178/68 |
| 4,133,004 A | 1/1979 | Fitts | 358/125 |
| 4,448,200 A | 5/1984 | Brooks et al. | 128/653 |
| 4,685,146 A | 8/1987 | Fenster et al. | 382/54 |
| 4,843,568 A | 6/1989 | Krueger et al. | 364/518 |
| 5,034,986 A | 7/1991 | Karmann et al. | 381/1 |
| 5,067,014 A | 11/1991 | Bergen et al. | 358/105 |
| 5,450,504 A | 9/1995 | Calia | 382/118 |
| 5,454,043 A * | 9/1995 | Freeman | 382/168 |
| 5,534,917 A | 7/1996 | MacDougall | 348/169 |
| 5,557,684 A | 9/1996 | Wang et al. | 382/107 |
| 5,586,231 A | 12/1996 | Florent et al. | 395/125 |
| 5,611,000 A | 3/1997 | Szeliski et al. | 382/294 |
| 5,649,032 A | 7/1997 | Burt et al. | 382/284 |
| 5,680,487 A | 10/1997 | Markandey | 382/291 |
| 5,704,836 A * | 1/1998 | Norton et al. | 463/36 |
| 5,805,170 A | 9/1998 | Burch | 345/433 |
| 5,805,745 A | 9/1998 | Graf | 382/291 |

(Continued)

FOREIGN PATENT DOCUMENTS

| | | |
|---|---|---|
| JP | 4-123122 | 4/1992 |
| JP | 09-185456 | 7/1997 |
| JP | 2000-020193 | 1/2000 |

OTHER PUBLICATIONS

Abstract Translation of "L": Patent Abstracts of Japan, "Input Device", Pub. No. 04–123122, Apr. 23, 1992, Sony Corp., Japan.

*Primary Examiner*—Alexander Eisen
(74) *Attorney, Agent, or Firm*—Martine Penilla & Gencarella, LLP (57) ABSTRACT

A device and method for effecting movement, responsive to user input, of an object on a graphical display are disclosed. An input device comprises a component for capturing video images, an input image processor that generates an output signal responsive to motion from the video images, and an output image processor that is programmed to effect movement of the object on the graphical display in response to signals received from the input image processor. Various algorithms are employed within the input image processor to determine initial and derivative data that controls the movement of the object on the graphical display. In a preferred embodiment, video images are captured and processed to isolate a human form from a background, arm position and movement data are calculated from the human form and a signal is generated responsive to this data for controlling the movement of an object, such as a bird, on a graphical display. The movement controlled on the graphical display can take the form of a moving object, or of the change of perspective that such an object might undergo, for example, a bird's eye view.

12 Claims, 7 Drawing Sheets

U.S. PATENT DOCUMENTS

| | | | |
|---|---|---|---|
| 5,825,308 A | 10/1998 | Rosenberg | 341/20 |
| 5,880,856 A | 3/1999 | Ferriere | 358/432 |
| 5,905,894 A | 5/1999 | De Bonet | 395/705 |
| 5,913,727 A | 6/1999 | Ahdoot | 463/39 |
| 5,917,937 A | 6/1999 | Szeliski et al. | 382/154 |
| 5,929,860 A | 7/1999 | Hoppe | 345/419 |
| 5,933,535 A | 8/1999 | Lee et al. | 382/243 |
| 5,959,673 A | 9/1999 | Lee et al. | 348/402 |
| 5,963,209 A | 10/1999 | Hoppe | 345/419 |
| 5,966,133 A | 10/1999 | Hoppe | 345/420 |
| 5,986,668 A | 11/1999 | Szeliski et al. | 345/433 |
| 5,987,164 A | 11/1999 | Szeliski et al. | 382/154 |
| 5,990,901 A | 11/1999 | Lawton et al. | 345/429 |
| 6,009,188 A | 12/1999 | Cohen et al. | 382/154 |
| 6,009,190 A | 12/1999 | Szeliski et al. | 382/154 |
| 6,018,349 A | 1/2000 | Szeliski et al. | 345/425 |
| 6,023,523 A | 2/2000 | Cohen et al. | 382/154 |
| 6,026,182 A | 2/2000 | Lee et al. | 382/173 |
| 6,031,934 A | 2/2000 | Ahmad et al. | 382/154 |
| 6,044,181 A | 3/2000 | Szeliski et al. | 382/284 |
| 6,046,744 A | 4/2000 | Hoppe | 345/419 |
| 6,049,619 A | 4/2000 | Anandan et al. | 382/107 |
| 6,049,636 A | 4/2000 | Yang | 382/289 |
| 6,072,494 A | 6/2000 | Nguyen | 349/358 |
| 6,101,289 A | 8/2000 | Kellner | 382/276 |
| 6,104,412 A * | 8/2000 | Tsutsuguchi et al. | 345/473 |
| 6,121,953 A | 9/2000 | Walker | 345/156 |
| 2003/0137486 A1 * | 7/2003 | Wilke | 345/156 |

* cited by examiner

USER INPUT DEVICE AND METHOD FOR INTERACTION WITH GRAPHIC IMAGES

FIELD OF THE INVENTION

The present invention relates generally to user input devices and methods for effecting movement of an object on a graphical display, and more specifically to an input device and method wherein video images of the user are captured and processed to provide a signal effecting translational and/or rotational movements of an object on a graphical display. In particular, this invention is applicable to graphical entertainment systems such as video games.

BACKGROUND OF THE INVENTION

Systems, methods, input and input devices employing video images are utilized for effecting the movement of an object on a graphical display such as a video monitor. Frequently, such video input devices are responsive to the movement or position of a user in the field of view of a video capture device. More recently, video image processing has been used to translate the movement of the user that has been captured as a sequence of video images into signals for game control. Prior art input systems include a video capture device that scans a field of view in which a system user stands. The captured video image is applied to a video digitizer that provides digital output to a processor that analyzes and processes the digital information received from the digitizer and, based upon the position or movement of the participant in the field of view, the processor produces signals that are used by the graphics generating system to move objects on the display. Although the operation or output of the devices or graphical displays can thereby be effected by the position or movement of the participant, the computer processing time required is frequently very extensive and complex, tending to require substantial computer and/or time resources.

In addition, known devices and methods employing user video image data that are used to effect the movement of an object on a graphical display are typically characterized by significant encumbrances upon the participant within the video camera field of view. Such systems may include additional equipment that the participant is required to wear, such as arm coverings or gloves with integral, more easily detectable portions or colors, and/or visible light sources such as light emitting diodes. However, such systems do not allow for the ease-of-use, quick response, and simplicity needed to provide a user input device capable of meeting marketability requirements for consumer items such as might be required of video game controllers.

Furthermore, known systems include additional analysis of the video images so as to understand or recognize the movement that is occurring, such as e.g., comparison to pre-existing marks, which adds to system complexity and response time, making them impractical for widespread use.

Moreover, although known systems may require the input video image processors to recognize and determine a significantly large number of segments, boundaries, and/or boxes in order to produce the output signals for graphical display control purposes, these systems do not allow for the calculation of an array of control signals based upon a minimal initial determination of limited segments/moments, nor do these systems provide for production of output signals in a simple, smooth fashion suitable for times and systems in which the input video resolution is low.

Therefore, present systems employing user video image input for interaction with an object on a graphical display are generally unable to offer the simplicity, responsiveness, and mass-marketability performance required while providing that an effective level of control is maintained over the output graphical display.

SUMMARY AND OBJECTS OF THE PRESENT INVENTION

In light of the disadvantages described above with respect to the present state of the art of user input employing video images for interaction with a graphical display, it is an object of the present invention to provide a user input system and method that afford a simplicity of design and methodology, yet provide for robust, effective interaction.

It is a further object of embodiments of the present invention to provide a user input system that allows for the calculation of an array of control signals from the initial determination of only several segments/moments.

It is yet a further object of embodiments of the present invention to provide a user input system that requires computer processing capacity compatible with consumer entertainment systems.

It is yet a further object of embodiments of the present invention to provide a user input system without any user encumbrances within the video camera field of view.

A device and method for effecting movement, responsive to user input, of an object on a graphical display are disclosed. An input device comprises a component for capturing video images, an input image processor that processes the captured video images and generates an output signal responsive to motion from the video images, and an output image processor that is programmed to effect movement of an object on the graphical display in response to signals received from the input image video processor. Various algorithms are employed within the input image processor to determine initial and derivative data that effects the movement of the object on the graphical display. In a preferred embodiment, video images are captured and processed to isolate a human form from a background, arm position and movement data are calculated from the human form, and a signal is generated by the input image processor that is responsive to this data for controlling the movement of an object, such as a bird, on a graphical display. The movement controlled on the graphical display can take the form of a moving object, or of the change of perspective that such an object might undergo (e.g., bird's eye view).

Other features and advantages of the present invention will be apparent from the accompanying drawings and from detailed description that follows.

BRIEF DESCRIPTION OF THE DRAWINGS

The present invention is illustrated by way of example and not limitation in the figures of the accompanying drawings, in which like references indicate similar elements, and in which.

DESCRIPTION OF THE PREFERRED EMBODIMENTS

A device and method for effecting movement, responsive to user input, of an object on a graphical display are disclosed. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Hardware Overview

Figure 1:
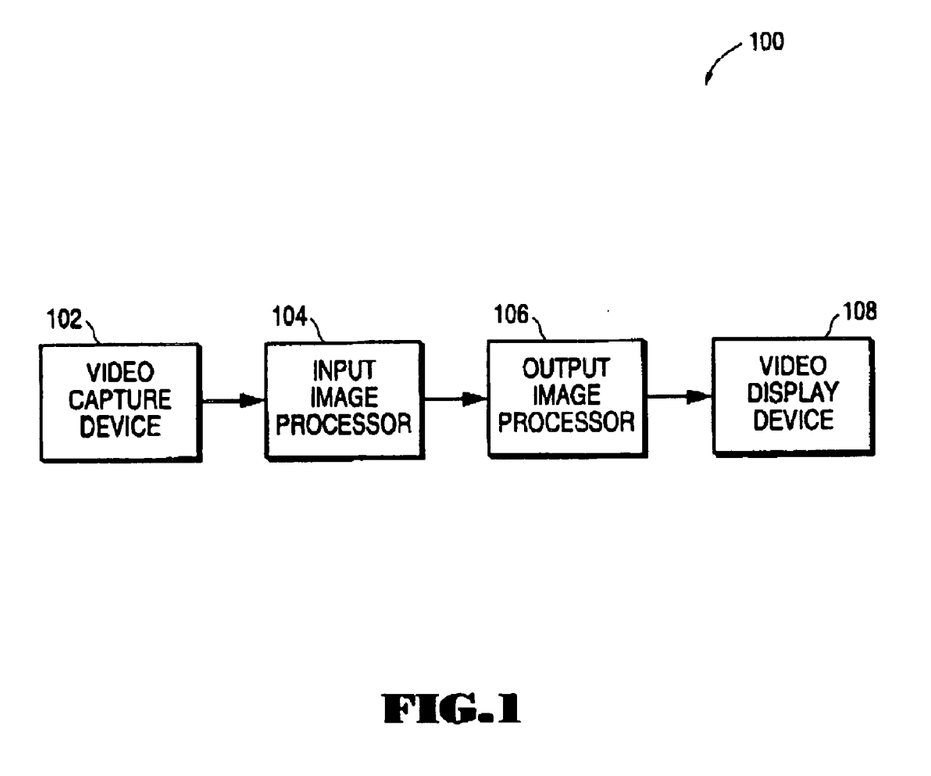
FIG. 1 is a block diagram of an exemplary user input system for interaction with an object on a graphical display that can be used to implement embodiments of the present invention.

Aspects of the present invention may be implemented by devices capable of performing basic video image processing and capable of graphical display. FIG. 1 is a block diagram of an exemplary user input system for interaction with an object on a graphical display that can be used to implement embodiments of the present invention. As shown in FIG. 1, user input system 100 is comprised of a video capture device 102, an input image processor 104, an output image processor 106, and a video display device 108.

The video capture device 102 can be any device capable of capturing sequences of video images, and, in the presently preferred embodiment, is a digital video camera (such as a "web-cam"), or similar image capturing device. The input image processor 104 translates the captured video images of human arm motion into signals that are delivered to an output image processor. In one embodiment, the input image processor 104 is programmed to: isolate the human form from the background in the captured video image, isolate the human arm portions from the torso, determine the position and movement of the human arms, and generate an output signal responsive to the position and/or movement of the human arms. The output image processor 106 is programmed to effect translational and/or rotational movement of an object on the video display device 108 in response to signals received from the input image processor 104.

These and additional aspects of the present invention may be implemented by one or more processors which execute software instructions. According to one embodiment of the present invention, a single processor executes both input image processing and output image processing. However, as shown in the figures and for ease of description, the processing operations are shown as being divided between an input image processor 104 and an output image processor 106. It should be noted that the invention is in no way to be interpreted as limited to any special processor configuration, such as more than one processor. The multiple processing blocks shown in FIG. 1 and the other Figures are shown only for convenience of description.

Figure 2:
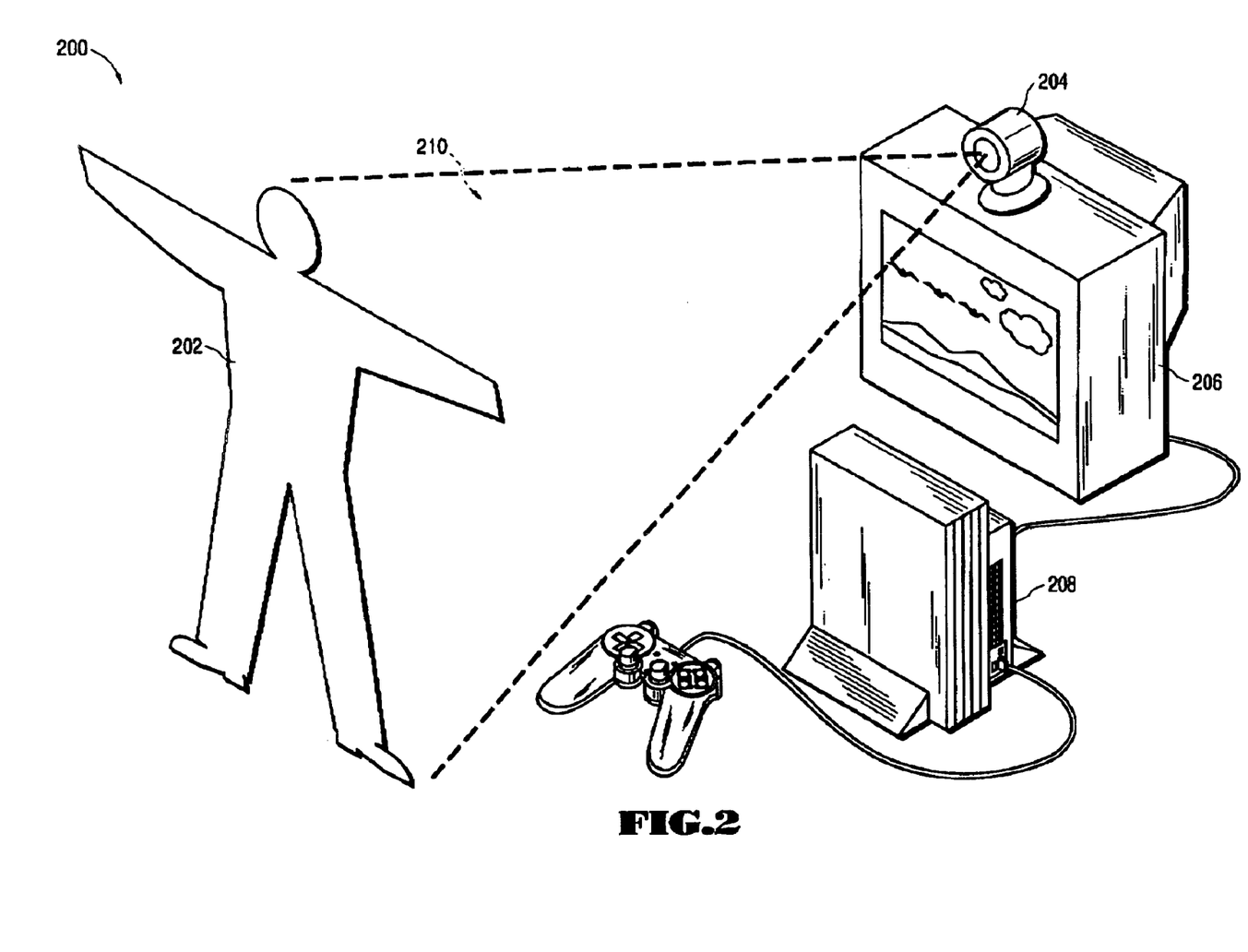
FIG. 2 illustrates a user input system for interaction with an object on a graphical display, according to one embodiment of the present invention.

FIG. 2 illustrates an input system for user interaction with an object on a graphical display, according to embodiments of the present invention. Input system environment 200 includes user 202, video capture device 204, video display device 206, and console 208 containing the processor functionality, such as a video game machine. User 202 in input system environment 200 should be located within the field of view 210 of the video capture device 204. This processing system 208 can be implemented by an entertainment system, such as a Sony® Playstation™ II or Sony® Playstation™ I type of processing and computer entertainment system, and such implementation is described in more detail below in the Preferred Embodiment section. It should be noted, however, that processing system 208 can be implemented in other types of computer systems, such as personal computers, workstations, laptop computers, wireless computing devices, or any other type of computing device that is capable of receiving and processing graphical image data.

Image Processing Method

The systems of FIGS. 1 and 2 are implemented along with a method for generating signals to effect translational and/or rotational movements of an object on a graphical display using human arm position and movement data captured by a video device. As the user 202 moves or positions himself within the field of view 210 of camera 204, corresponding movements or positioning of an object or objects on the display device 206 are effected. For example, the movement of the user can be used to move a cursor or animated character on the display device relative to a displayed background scene. In a preferred embodiment, the steps of this video processing methodology are: (1) subtraction of the background within the field of view, (2) determination of field of view object, (3) determination of arm/appendage angle or position, and (4) determination of flight parameters.

Step 1: Background Subtraction

When a person or other object that is used to control graphic display movement is in the field of view 210, the image of the person is captured by the digital camera 204 to produce pixel data for processing by processor unit 208. In one embodiment of the present invention, background subtraction is used to create a per-pixel labeling of the image as either person (foreground) or non-person (background). This is accomplished by storing a frame from the video sequence when the scene does not include the person. The stored frame is subtracted from the live video sequence to create the foreground image using a subtractive filtering process. There are several variations on how this subtraction might be accomplished. In one embodiment, a simple thresholding scheme is used on the weighted sum of the luminance and chrominance to determine whether a pixel is in the foreground or background. The basic process is as follows: first, obtain static background Y0 U0 V0 frames; second, smooth images Y0 U0 V0 using a 5×5 Gaussian convolution; third, obtain current Y U V video frames; fourth, smooth images Y U V using a 5×5 Gaussian convolution; fifth, for each pixel in Y, compute Ydif=abs(Y−Y0); sixth, for each pixel in U, compute Udif=abs(U−U0); seventh, for each pixel in V, compute Vdif=abs(V−V0); eighth, for each pixel in Ydif Udif Vdif, and compute Sum=Ydif+Udif*8+Vdif*8; ninth, for each pixel in Sum, compute Foreground=1 if Sum>Threshold, otherwise, Foreground=0; and tenth, erode Foreground using standard erosion morphological filter (to remove any single-pixel erroneous measurements, such as caused by salt-and-pepper noise). In general only steps the third through tenth steps described above are repeated every video frame. In the above process, Y represents the luminance of the pixels, and U and V represent the chrominances of the pixels.

Step 2: Person in View Decision

The next step is determining whether a person is in the field of view of the video capture device or not. This determines whether or not the video image processing of the user will be used to drive the graphical display application. This step consists of counting the total number of nonzero pixels in the Foreground image, and making sure that the total falls between a minimum and a maximum threshold. The minimum threshold serves to ensure that there is some difference between the static background and the current video frame. The maximum threshold serves to ensure that this difference is not too great; for example, this might be caused by a person completely blocking the camera image, or by forgetting to initialize the stored background frame.

Step 3: Arm Angle Determination

Figure 3:
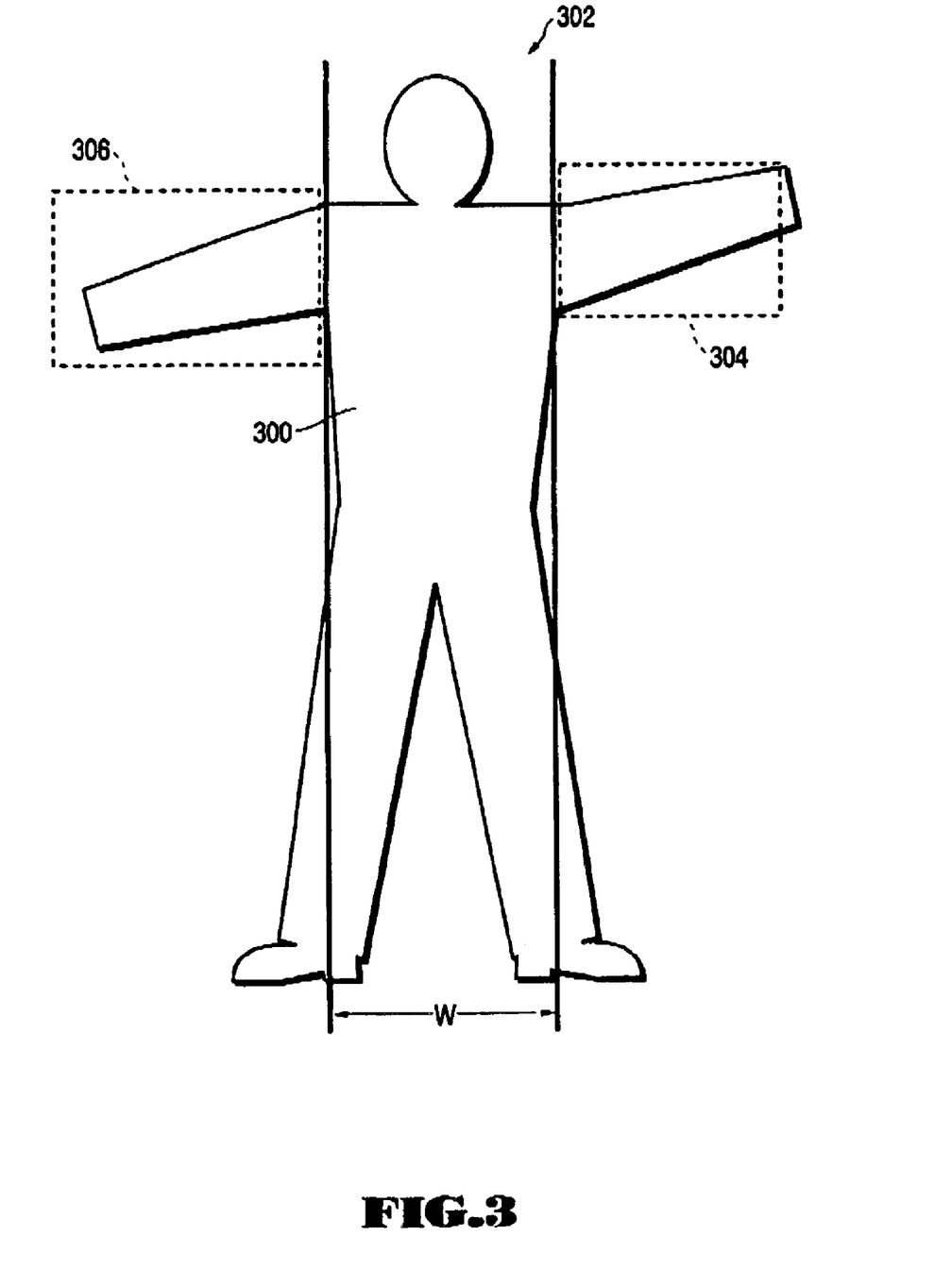
FIG. 3 is an exemplary diagram of a human image showing division into left and right arm subimages for determination of arm angles, according to one embodiment of the present invention.

In one embodiment of the present invention, movement or positioning of the displayed graphical object on the display is effected by movement or positioning of the in-view person's arms and/or legs. This process is generally accomplished by computing area statistics of the isolated foreground image. FIG. 3 is an exemplary diagram of a foreground (human) image showing division into left and right arm sub-images for determination of arm angles, according to one embodiment of the present invention. Foreground image 302 includes human figure torso portion 300, left arm sub-image 306 and right arm sub-image 304. First, as seen in FIG. 3, the horizontal extent, "W" of the torso is determined by computing the centroid and second horizontal moment of the nonzero pixels in the Foreground image:

1. TorsoStartX=CentroidX−Sqrt(SecondMomentX)
2. TorsoEndX=CentroidX+Sqrt(SecondMomentX)

where TorsoStartX is shown as the line running down the left side of torso portion 300, and TorsoEndX is shown as the line running down the right side of torso portion 300.

Next, the sub-image 306 to the left of TorsoStartX is processed to determine the left arm angle. The angle of principal moment of the nonzero pixels in this sub-image is calculated. This angle can range from 0 to 180 degrees, which represents the allowed range of movement of the left arm. The sub-image 304 to the right of TorsoEndX is processed identically. The angle of principal moment can be thought of as finding the slope of a line that best fits the pixels. Finding the angle of principal moment is a standard technique in image processing and dynamical modeling. Such a technique may be found in the textbook *Mechanics of Materials* by Timoshenko and Gere, 1997, for example.

Step 4: Flight Parameter Determination

Characteristics regarding the position of the user, and the rate and type of movement of his or her arms are used to effect movement of graphical elements displayed on a graphical display. For example, the user's movement can be used to control the motion of a game character that is used in a flying game in which the character is seen as flying over a landscape.

With regard to the parameters associated with the flying game, the angles of each person's arm relative to his or her torso are processed to compute the airspeed acceleration, bank angle, and pitch angle for the flying simulation program. Bank angle is computed from the signed difference of the two arm angles. Pitch angle is computed from the average of the two arm angles, minus 90 degrees (so that arms straight out represent a zero pitch angle). The pitch angle is then scaled down by 0.1 (−90 to 90 pitch would be too large). Airspeed acceleration is calculated as the time rate of change of the average of the arm angles (scaled to be appropriate). The time rate of change is calculated over several frames to produce a smoother signal.

In general, all of the computed parameters are smoothed before they are used to generate graphical display images. This smoothing adds a bit of time lag, but results in a less jerky (time delayed) video display. The smoothing is especially desirable when the video capture equipment or processing system is capable of only low resolution processing.

In one embodiment, the calculation of the various parameters to produce graphical processing variables for a flight simulator or similar flying program are as follows:

1. BankAngle=LeftAngle−RightAngle
2. PitchAngle=(((LeftAngle+RightAngle)/2.0)−90)*0.1
3. Accel=abs((LeftAngle+RightAngle)−(LeftAnglePrev+RightAnglePrev))*K
4. The smoothing is calculated as follows:

BankAngleSmooth=k1*BankAngle+(1−k1)*BankAngleSmooth

PitchAngleSmooth=k2*PitchAngle+(1−k2)*PitchAngleSmooth

AccelSmooth=k3*Accel+(1−k3)*AccelSmooth

The smoothed quantities are the ones used for the simulation. The constants k1, k2, and k3 specify the response characteristics of the displayed object. This allows the correlation of user motion and displayed object motion to be customized for various experiences. For example, in a flight simulator program, the constants can be programmed to select or dictate different characteristics related to different types of planes or flying objects, thus allowing different simulation experiences. For example, one setting of the constants can be used to simulate a jet feeling, while another setting of the constants can be used to simulate a hangglider feeling.

Figure 4:
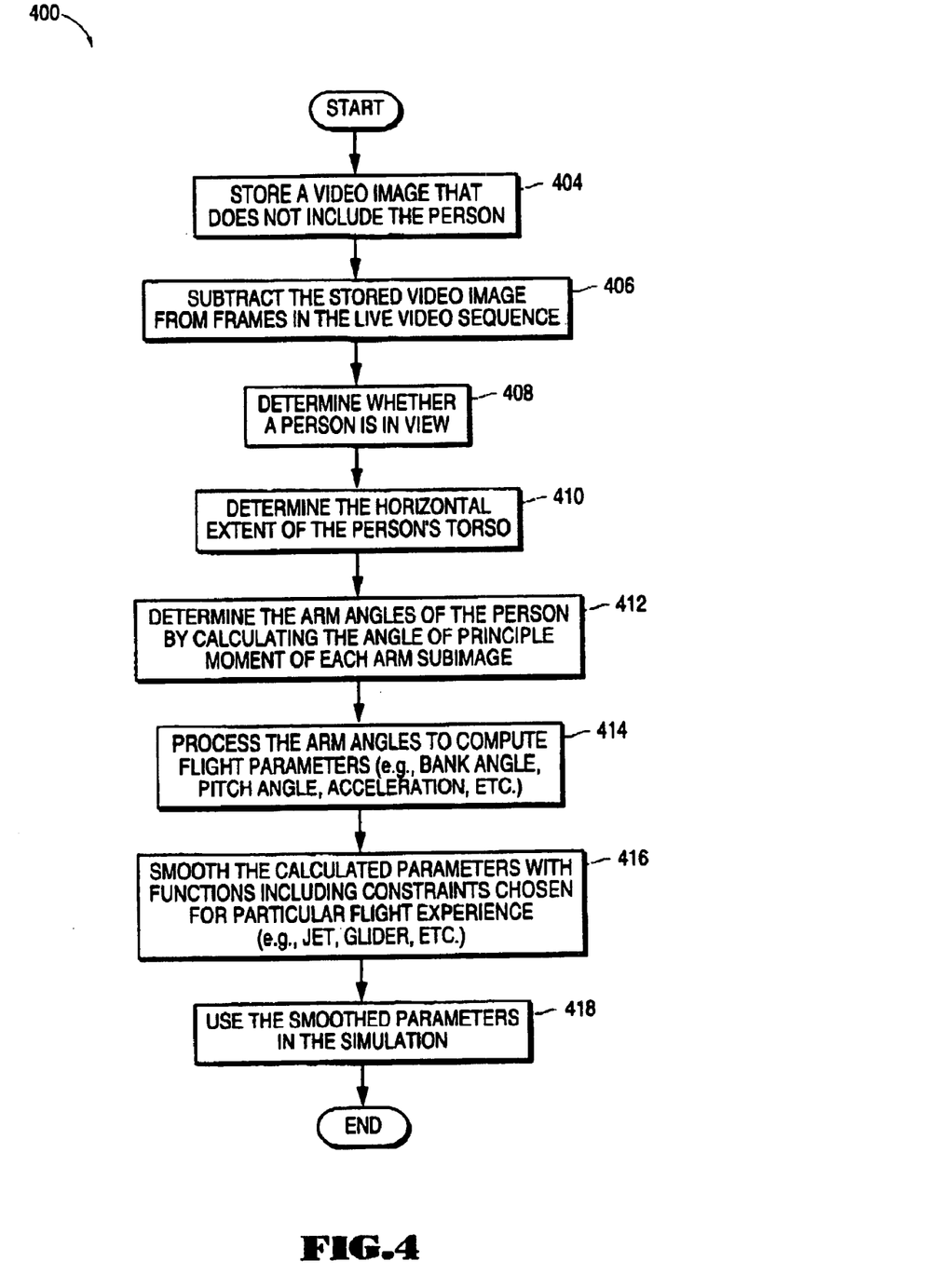
FIG. 4 is a flow chart that illustrates the steps of effecting movement, responsive to the movement of a user's arms, of an object on a graphical display, according to one embodiment of the present invention.

FIG. 4 is a flowchart that illustrates the steps of effecting movement of an object on a display device responsive to the movement of a user's arms following the methodology described above, for one embodiment of the present invention. The first two steps of flowchart 400 in FIG. 4 comprise the step of background subtraction. In step 404, a captured video image that does not include the person is stored, and in step 406, the stored video image is subtracted from the live video sequence. Next, it is determined whether a person is within the field of view of the digital camera, step 408. Step 410 consists of the first part of the arm angle determination step, that of determining the horizontal extent of the torso. In step 412 each arm angle is determined. This is performed by calculating the angle of principle moment of each arm sub-image.

For the preferred embodiment, the flight parameter determination step is comprised of the last three steps of FIG. 4. First, in step 414, process the arm angles to compute the flight parameters using the same equations as recited above.

Second, in step 416, the quantities are smoothed with functions including constants chosen for a particular flight experience (e.g., jet, glider, etc.). Finally, in step 418, the smoothed parameters are used in the flight simulation to effect translational and/or rotational movement of an object on a graphical display.

According to an alternate embodiment of the present invention, a signal is generated for use within any known electrical communication systems, not just merely for effecting movement of an object in a graphical display. This embodiment can be described as a method for generating signals responsive to human arm position and/or movement data, comprising: providing an image processor and a device for capturing video images, capturing video images with the device and using the image processor to process those images to isolate a human form from a background, isolating the arm portions of the human form from a captured video image using the image processor, calculating the arm position and movement data using the image processor, and generating a signal responsive to the arm position and movement data using the image processor.

Graphical Input and Processing Functionality

Figure 5:
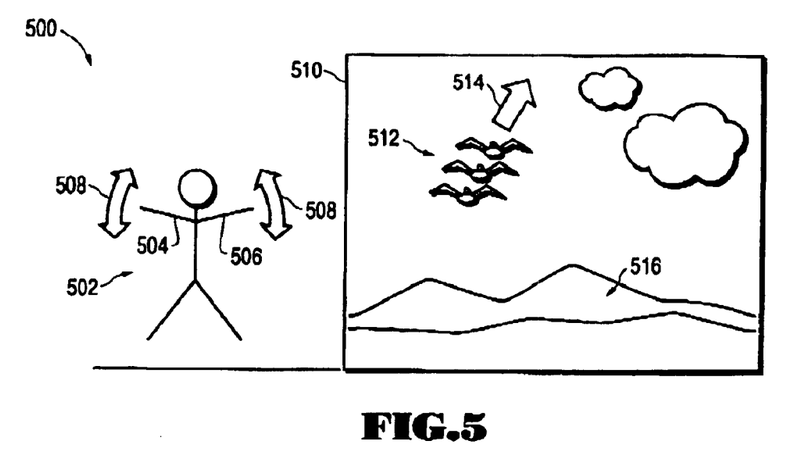
FIG. 5 illustrates the correlation between a user's arms and an object on a graphical display for a first instance of user position, according to one embodiment of the present invention.

In the presently preferred embodiment, a user's arm action is captured by the video capture device and the corresponding action is translated into the motion of a bird character shown on a graphical display. Some representative arm actions and their correlation to bird movement are illustrated in FIGS. 5 through 9. FIG. 5 illustrates the correlation between the flapping of a user's arms and a bird ascending on the graphical display, according to one embodiment of the present invention. As shown in FIG. 5, correlation system 500 shows user 502, having left arm 504 and right arm 506, flapping his arms, as illustrated by two-directional arrows 508. On the corresponding graphical display 510 and in relation to the landscape 516, this action correlates to bird 512 ascending, as illustrated by arrow 514.

Figure 6:
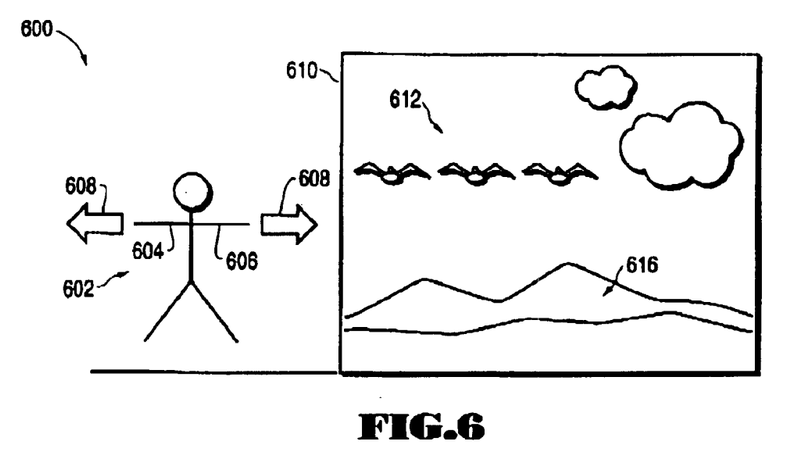
FIG. 6 illustrates the correlation between a user's arms and an object on a graphical display for a second instance of user position, according to one embodiment of the present invention.

FIG. 6 illustrates the correlation between a user maintaining his or her arms straight out and a bird soaring on the graphical display, according to one embodiment of the present invention. As shown in FIG. 6, correlation system 600 shows user 602, having left arm 604 and right arm 606, maintaining his arms straight out, as illustrated by horizontal arrows 608. On the corresponding graphical display 610 and in relation to the landscape 616, this action correlates to bird 612 soaring, as illustrated by the level flight path.

Figure 7:
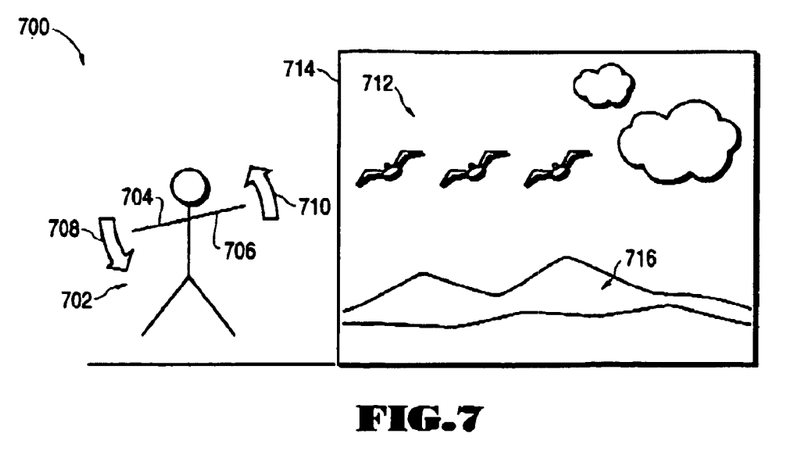
FIG. 7 illustrates the correlation between a user's arms and an object on a graphical display for a third instance of user position, according to one embodiment of the present invention.

FIG. 7 illustrates the correlation between a user tilting his or her arms to the left and a bird banking left on the graphical display, according to one embodiment of the present invention. As shown in FIG. 7, correlation system 700 shows user 702, having left arm 704 and right arm 706, positioning his arms so the left arm 704 is lower than the right arm 706, as illustrated by down arrow 708 and up arrow 710, respectively. On the corresponding graphical display 714 and in relation to the landscape 716, this action correlates to bird 712 banking left, as illustrated by axes of the bird bodies having a positive slope.

Figure 8:
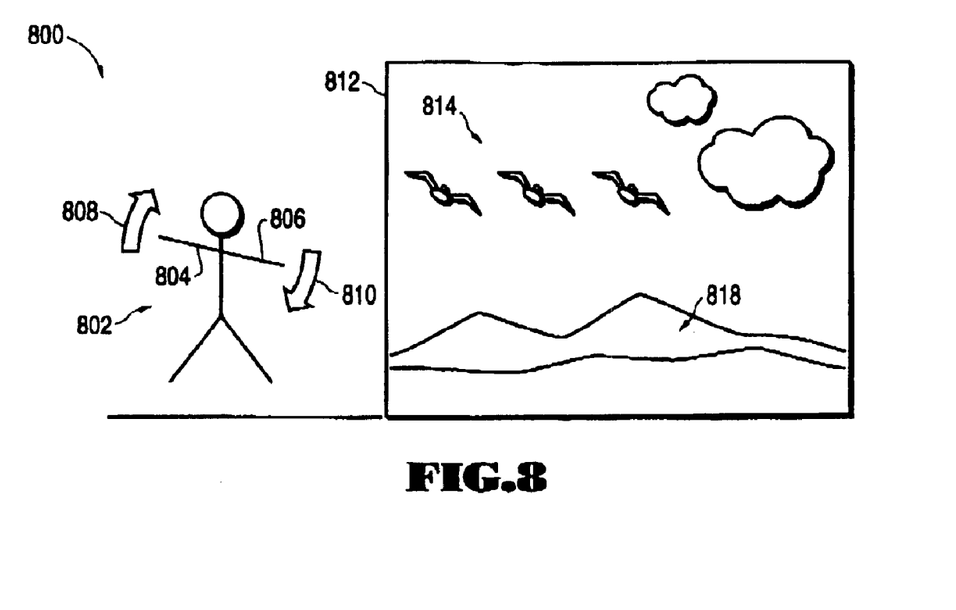
FIG. 8 illustrates the correlation between a user's arms and an object on a graphical display for a fourth instance of user position, according to one embodiment of the present invention.

FIG. 8 illustrates the correlation between a user tilting his or her arms to the right and a bird banking right on the graphical display, according to one embodiment of the present invention. As shown in FIG. 8, correlation system 800 shows user 802, having left arm 804 and right arm 806, positioning his arms so the left arm 804 is higher than the right arm 806, as illustrated by up arrow 808 and down arrow 810, respectively. On the corresponding graphical display 812 and in relation to the landscape 818, this action correlates to bird 814 banking right, as illustrated by axes of the bird bodies having a negative slope.

Figure 9:
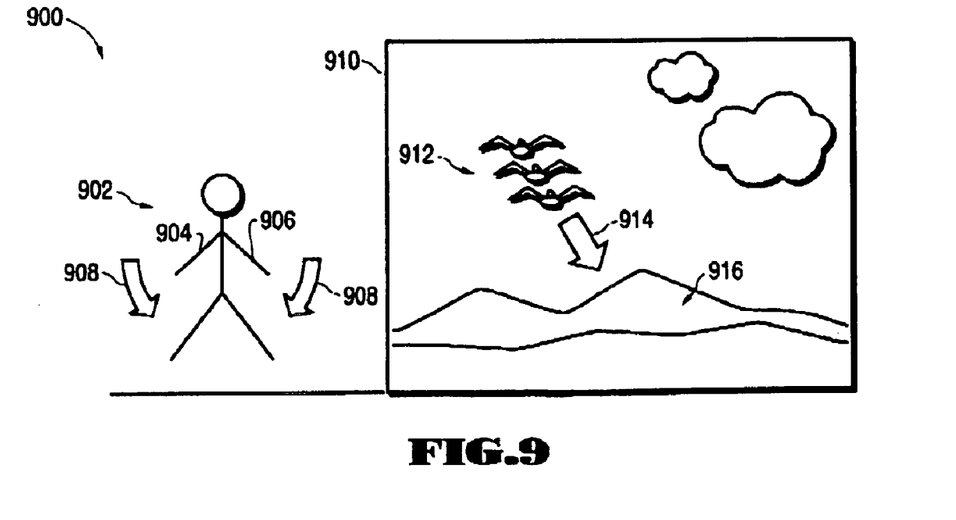
FIG. 9 illustrates the correlation between a user's arms and an object on a graphical display for a fifth instance of user position, according to one embodiment of the present invention.

FIG. 9 illustrates the correlation between a user tucking his or her arms back and a bird plunging on the graphical display, according to one embodiment of the present invention. As shown in FIG. 9, correlation system 900 shows user 902, having left arm 904 and right arm 906, positioning his arms so as to be tucked back, as illustrated by down arrows 908. On the corresponding graphical display 910 and in relation to the landscape 916, this action correlates to bird 912 plunging, as illustrated by arrow 914.

Figure 10:
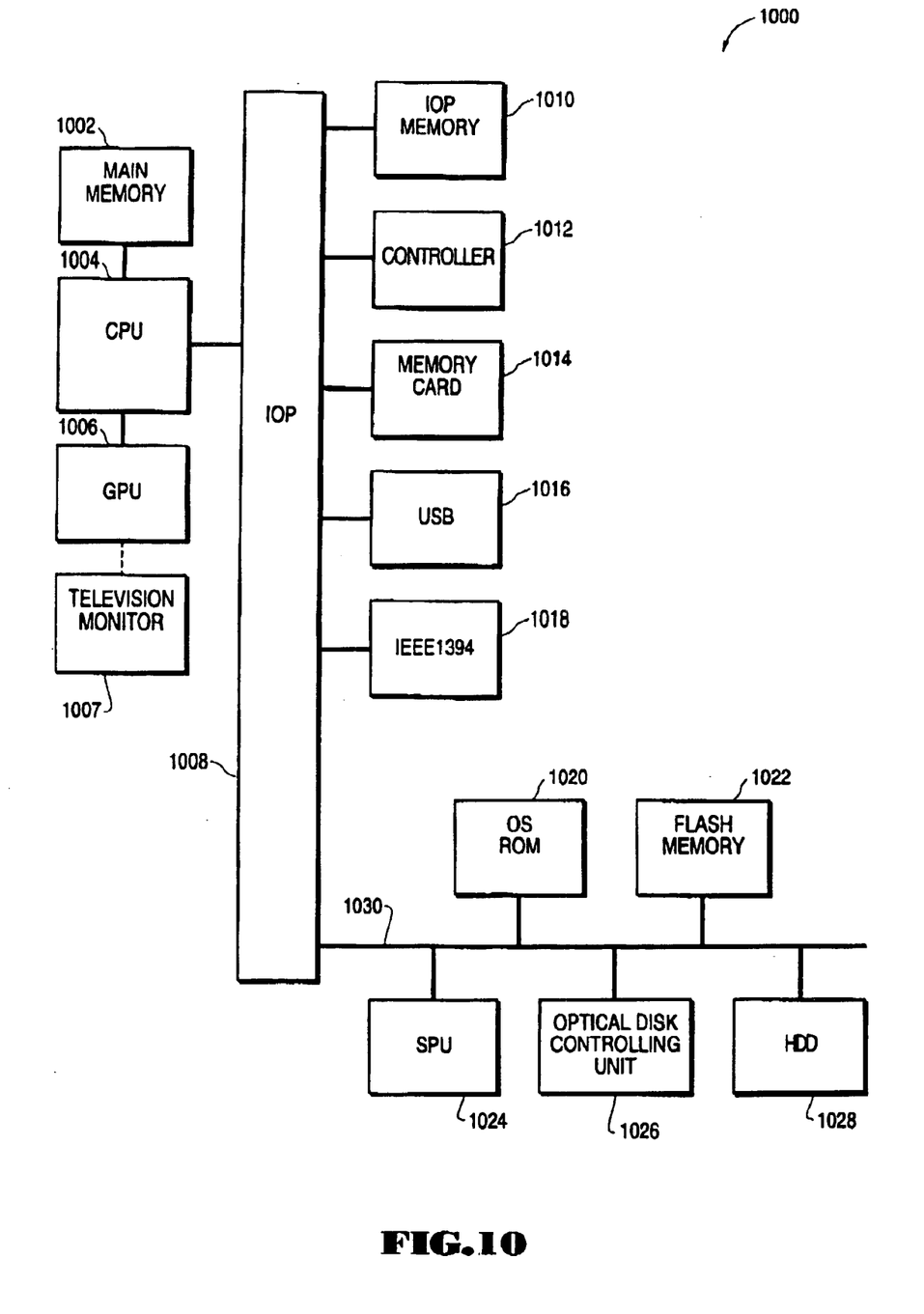
FIG. 10 is a block diagram of an exemplary processing system that implements user input devices and methods according to embodiments of the present invention.

In the preferred embodiment, the user input devices and methods of the present invention are implemented by a computer processing system illustrated by the block diagram of FIG. 10. The processing system may represent a computer-based entertainment system embodiment that includes a central processing unit ("CPU") 1004 coupled to a main memory 1002 and graphical processing unit ("GPU") 1006. The CPU 1004 is also coupled to an Input/Output Processor ("IOP") Bus 1008. In one embodiment, the GPU 1006 includes an internal buffer for fast processing of pixel based graphical data. Additionally, the GPU can include an output processing portion or functionality to convert the image data processed into standard television signals, for example NTSC or PAL, for transmission to a television monitor 1007 connected external to the entertainment system 1000 or elements thereof. Alternatively, data output signals can be provided to a display device other than a television monitor, such as a computer monitor, LCD (Liquid Crystal Display) device, or other type of display device.

The IOP bus 1008 couples the CPU 1004 to various input/output devices and other busses or device. IOP bus 1008 is connected to input/output processor memory 1010, a controller 1012, a memory card 1014, a Universal Serial Bus (USB) port 1016, an IEEE1394 (also known as a Firewire interface) port, and bus 1030. Bus 1030 couples several other system components to CPU 1004, including operating system ("OS") ROM 1020, flash memory 1022, a sound processing unit ("SPU") 1024, an optical disc controlling unit 1026, and a hard disk drive ("HDD") 1028. In one aspect of this embodiment, the video capture device can be directly connected to the IOP bus 1008 for transmission therethrough to the CPU 1004; there, data from the video capture device can be used to change or update the values used to generate the graphics images in the GPU 1006. Moreover, embodiments of the present invention can use a variety of image processing configurations and techniques, such as those described in U.S. patent application Ser. No. 09/573,105 filed May 17, 2000, and entitled OUTLINE GENERATING DATA, GENERATING METHOD AND APPARATUS, which is hereby incorporated by reference in its entirety.

Programs or computer instructions embodying aspects of the present invention can be provided by several different methods. For example, the user input method for interaction with graphical images can be provided in the form of a program stored in HDD 1028, flash memory 1022, OS ROM 1020, or on a memory card 1012. Alternatively, the program can be downloaded to the processing unit 1000 through one or more input ports coupled to the CPU 1004. The program modules defining the input method can be provided with the game or application program that is executed by the CPU 1004 and displayed on display device 1007 or they may be provided separately from the application program, such as for execution from local main memory 1002.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software; it is also not limited to any specific combination of general hardware circuitry and/or software, nor to any particular source for the instructions executed by processing components.

Other Embodiments

In one embodiment, a flapping noise can be added to the demonstration. The flapping noise is triggered when the signed time rate of change of the average of the arm angles exceeds a particular threshold. This leads to a flapping noise only when the user moves his or her arms down together. The volume of the flapping noise is scaled by that behavior as well, so a more exaggerated flapping motion produces a louder flapping sound.

A further embodiment has an addition to the demonstration in which the arm angles are used to index into a pre-generated animation of a bird flapping its wings. The arm angles are used as indices into this animation. In this embodiment, the demonstration can be from a first person perspective, so animation of the bird will not be seen, though its shadow, as cast by the sun on the landscape, can be seen.

In the network demonstration, the actual bird animation corresponding to the motion of the other person playing. Several animations of bird variants can exist, such as a dragon, eagle, and hawk. The smoothing parameters described above will be set to provide a slightly different flight experience for each of the animations (e.g., the dragon is big and slow, so the glider parameters are used, while the hawk is small and quick, so the fighter-jet parameters are used).

As can be appreciated by those of ordinary skill in the art, applications of the graphical input and processing methods described herein can be extended to other types of simulations or programs other than flying games or simulators. For example, the user motion can be used to control objects in video game or educational programs that include driving objects, running objects, or various sports games that involve user motion, such as skiing, bicycling, fighting, and similar action.

Furthermore, although embodiments of the present invention were illustrated and described with respect to movement of the user's arms being used to effect movement of a displayed object, it should be noted that similar processing techniques could be used to provide graphical control based on movement of the user's legs or head or objects held by the user.

Embodiments of the present invention allow for the advantageous and convenient implementation of various post-processing filtering and special effects on the displayed object, such as shadow effects, distortion, morphing effects, and the like. Such post-processing filtering and special effects are advantageous additions and can be used to capitalize on the simplicity and efficiency of the fundamental system.

In the foregoing, a user input system for effecting movement of an object on a graphical display has been described. Although the present invention has been described with reference to specific exemplary embodiments, it will be evident that various modifications and changes may be made to these embodiments without departing from the broader spirit and scope of the invention as set forth in the claims.

For example, embodiments of the invention can be extended to applications other than just systems having an output related to flying or flying games. In general, any graphical based application in which movement or positioning of a displayed object is controlled by the movement or positioning of a user can be used in conjunction with the processing methods described herein. Accordingly, the specification and drawings are to be regarded in an illustrative rather than a restrictive sense.

What is claimed is:

1. A method for generating signals to effect one of translational movement, rotational movement, and both translational and rotational movements of an object on a graphical display using one of human arm position data, human arm movement data, and both human arm position and movement data, comprising:

providing an image processor and a device for capturing a video sequence;

capturing, from the video sequence, a frame that does not include a person;

isolating a view comprising a foreground subject image view by performing an algorithm on the video sequence and the frame that does not include the person, wherein the algorithm includes subtracting the frame that does not include the person from individual frames in the video sequence;

determining whether the isolated view includes an image of a person by ensuring that a number of nonzero pixels in the foreground image is within a range indicative of a presence of the image of the person;

determining a horizontal extent of a torso in the image of the person so as to isolate arm portions of the person in frames of the captured video sequence;

computing arm angles by calculating angles of principle moment of nonzero pixels in the arm portions of the image of the person; and generating an arm position data signal responsive to arm angles for effecting one of translational movement, rotational movement, and both translational and rotational movement of an object on a graphical display.

2. The method of claim 1 wherein ensuring that the number of nonzero pixels in the foreground image is within the range indicative of the presence of the image of the person includes, counting a total number of nonzero pixels in the foreground image; and verifying that the total number of nonzero pixels in the foreground image is within a range extending from a minimum threshold number of pixels to a maximum threshold number of pixels.

3. The method of claim 1 wherein the following algorithm is used in the isolating step:

(a) obtain static background Y0 U0 V0 frames;

(b) smooth images Y0 U0 V0 using a 5×5 Gaussian convolution;

(c) obtain current Y U V video frames;

(d) smooth images Y U V using a 5×5 Gaussian convolution;

(e) for each pixel in Y, compute Ydif=abs(Y−Y0);

(f) for each pixel in U, compute Udif=abs(U−U0);

(g) for each pixel in V, compute Vdif=abs(V−V0);

(h) for each pixel in Ydif Udif Vdif, compute Sum=Ydif+Udif*8+Vdif*8;

(i) for each pixel in Sum, compute Foreground=1 if Sum>Threshold, 0 otherwise;

(j) erode Foreground using standard erosion morphological filter (to remove any single-pixel erroneous measurements, such as caused by salt-and-pepper noise).

4. The method of claim 1 wherein the arm position data signal generated in the generating step is selected from the group consisting of signals related to object airspeed acceleration, bank angle, and pitch angle.

5. The method of claim 1 wherein the arm position data signal generated in the generating step is determined with the inclusion of smoothing constants.

6. A method for generating signals for use in a flight simulator graphical display using human arm position data to effect one of translational movement, rotational movement, and both translational and rotational movement, comprising:

provid­ing a device for capturing video images and an image processor;

capturing video images with the device, the video images including an image of a background without a human form and an image of a background with a human form;

using the image processor to process the captured video images to isolate the human form from the background;

isolating arm portions of the human form from a captured video image using the image processor;

calculating arm position and movement data using the image processor;

generating a signal responsive to the arm position and movement data using the image processor for use in generating a state of a flight simulator graphical display, wherein the flight simulator graphical display includes as an object a flying creature that moves wings in response to the generated signal; and generating flapping noise corresponding to movement of the wings of the flying creature.

7. The method of claim 6 wherein the flight simulator graphical display depicts a change in perspective of what a flying creature would see.

8. The method of claim 6 wherein a volume of the flapping noises increases with an increased rate of arm motion.

9. The method of claim 6 wherein the flapping noises are triggered when a signed time rate of change of an average of arm angles exceeds a pre-determined threshold.

10. A method for generating signals for use in a flight simulator graphical display using human arm position data to effect one of translational movement, rotational movement, and both translational and rotational movement, wherein the flight simulator graphical display includes as an object a flying creature that moves wings, comprising:

providing a device for capturing video images and an image processor;

capturing video images with the device;

using the image processor to process the captured video images to isolate a human form from a background;

isolating arm portions of the human form from a captured video image using the image processor;

calculating arm position and movement data using the image processor;

generating a signal responsive to the arm position and movement data using the image processor, the signal to be used in generating a state of the flight simulator graphical display; and generating flapping noises corresponding to a movement of the wings of the flying creature.

11. The method of claim 10 wherein a volume of the flapping noises increases with an increased rate of arm motion.

12. The method of claim 10 wherein the flapping noises are triggered when a signed time rate of change of an average of calculated arm angles exceeds a predetermined threshold.

* * * * *